Jan. 8, 1957 W. S. JENNETTE 2,776,516
FISHING ROD
Filed Oct. 11, 1954
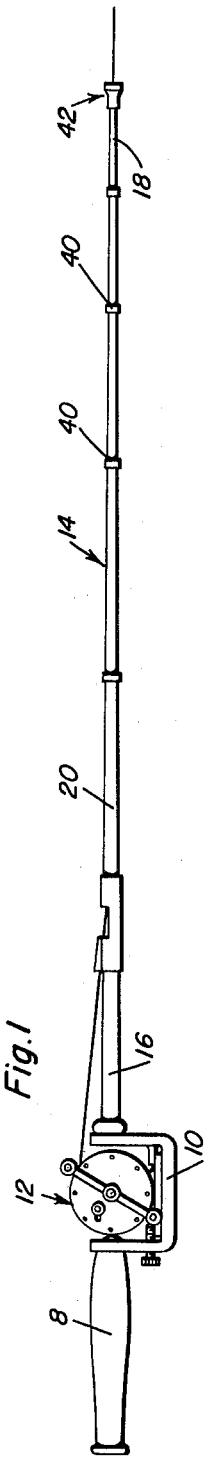
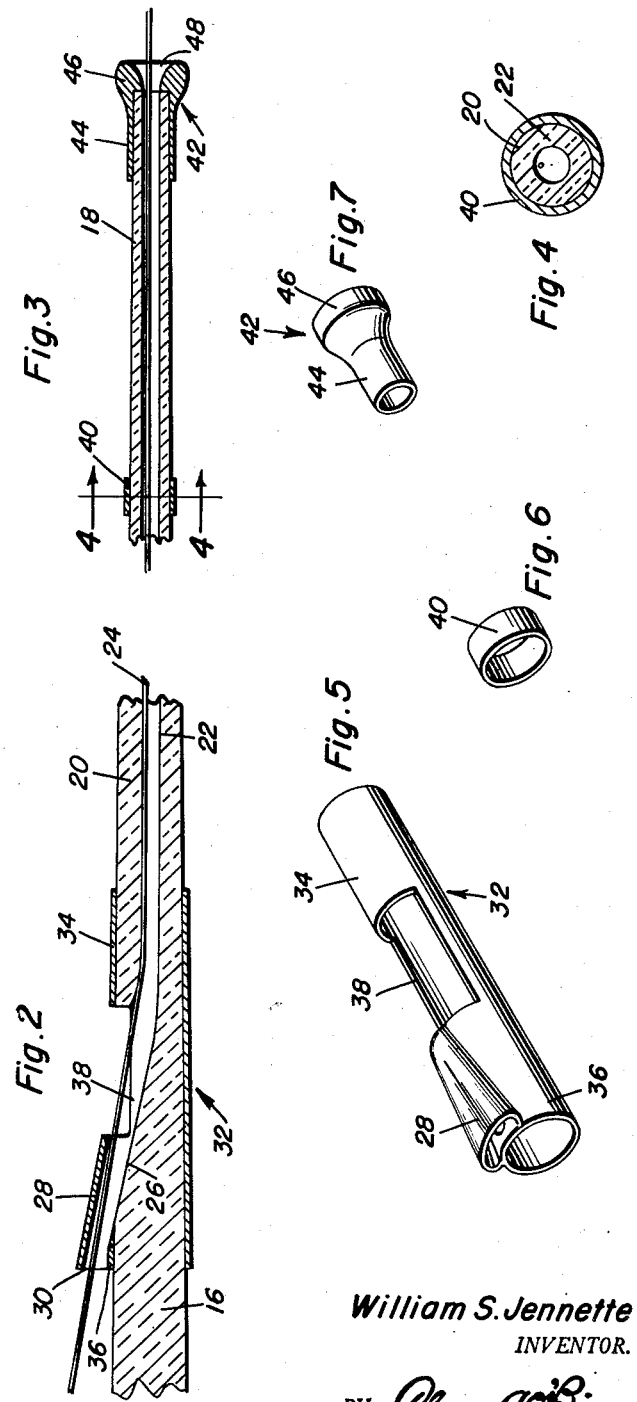
William S. Jennette
INVENTOR.

United States Patent Office 2,776,516
Patented Jan. 8, 1957

2,776,516

FISHING ROD

William S. Jennette, Elizabeth City, N. C.

Application October 11, 1954, Serial No. 461,484

2 Claims. (Cl. 43—24)

The present invention relates to certain new and useful improvements in fishing rods and has particular reference to a rod of greatly simplified and sturdy construction which, it is believed, will meet the requirements of manufacturers and needs of anglers and others in that it is such in construction that it obviates the need for exterior line guides and specially constructed line wearing tips.

Another object of the invention is to provide a rod having a fishing line bore extending longitudinally through the major portion of the rod, making it possible to dispense with line guides and special tip constructions and thus reducing bait entanglements to an appreciable minimum.

Another object of the invention is to provide a rod which is constructed as above briefly stated and which virtually ensures longevity for the line inasmuch as experience with the improved rod shows that the line lasts many times as long, that there is less chance of losing a bait or baits or other fishing gear and that there is less chance of accidentally losing a hooked fish.

An equally important object is to so construct a fishing rod that undue frictional contact between the line and rod is prevented by way of antichafing means on the rod, whereby to thus provide a rod construction which will make it possible to attain easier and longer casts and, in this way, to ensure fish retrieving results not ordinarily brought about when using currently available eye-equipped and equivalent rod constructions.

Briefly summarized, a preferred embodiment of the invention has to do with a fishing rod equipped with a hand grip at its inward end, a reel adjacent said hand grip, that portion of said rod beyond said reel having an axial line bore opening through the outer end of the rod, the inner end of said bore having an oblique angled line inlet opening through the peripheral surface of said rod, an antichafing line guiding and piloting thimble, and means mounting said thimble on the rod in alignment with said inlet opening.

Other objects, features and advantages will become more readily apparent from the following description and the accompanying sheet of illustrative drawings.

In the drawings, wherein like numerals are employed to designate like parts throughout the views:

Figure 1 is an elevational view of a fishing rod constructed in accordance with the principles of the present invention;

Figure 2 is an enlarged fragmentary sectional view of that portion of the rod outwardly of the usual reel;

Figure 3 is a similar sectional view showing the distal or outer end portion of the rod;

Figure 4 is a section on the line 4—4 of Figure 3, looking in the direction of the arrows;

Figure 5 is a perspective view of the improved antichafing thimble and the adapter sleeve which is used for mounting it in operative position on the rod; and Figures 6 and 7 are perspective views of certain of the details.

Referring now to the drawings, the rod, generally speaking, may be thought of as including a suitable handle or hand grip 8 to which is attached the usual yoke-type seat 10 for the conventional type fishing reel 12. The rod proper is denoted, generally speaking, by the numeral 14, and this is of commercial plastics or glass of an appropriate grade and is, of course, of appropriate length and strength. Copper alloy or any other equivalent material may be used in the construction of the rod. In any event, it includes a relatively stout inner or proximal end portion 16 which is secured to the reel seat in Figure 1, an outer slender end portion 18 and an intermediate portion 20. The portions 20 and 18 form what may be described as the major part of the rod, and this is of tubular cross-section providing, as is evident from Figures 2 and 3, an axial bore 22 for the fishing line 24. It will be noticed in Figure 2 that the rear or inner end portion of the bore has an oblique angled portion 26 which is an inlet for the fishing line as it comes off the reel 12. The line guiding and piloting means is characterized essentially by a substantially conical antichafing thimble 28 whose larger end portion 30 is substantially oval and is directed toward the reel. The gradually tapering opposite end registers with the oblique angled inlet for the main bore 22. Actually, this thimble is mounted on an adapter sleeve which is denoted by the numeral 32, and one end portion 34 of which embraces the rod, and the other end portion 36 also embraces the rod with an intermediate portion having a slot or notch 38 formed therein in registry with the oblique angled inlet 26. The restricted or small end of the passage through the antichafing thimble is, of course, in alignment with the bore 22 by way of the inlet 26, all as brought out in Figure 2.

Incidentally, the numerals 40 designate reinforcing bands which embrace the rod exteriorly at longitudinally spaced points.

At the outer end 18, there is an additional component which may be here treated, broadly speaking, as a tip 42. This comprises a ferrule 44 surrounding the rod and fitted tightly and provided at its outer end with a ring-like collar 46 providing an additional antichafing guide. Specifically, the inner periphery 48 of the collar is of concave formation and is slightly truncated-conical in form with the truncated end merging into and registering with the adjacent end of the bore in the rod. This provides for smooth sliding of the line in and out of the bore 22.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. For use on and in conjunction with a fishing rod having a hand grip at the inward end of the rod, a line-equipped reel mounted on the rod adjacent said hand grip, that portion of said rod outwardly and beyond said reel having an axial fishing line accommodating bore therein opening through the outer end of the rod and an inner end portion having a line directing inlet opening through the peripheral surface of said rod in communication with said bore; means for directing and "slipping" said line, when cast in the usual manner from said reel, into said bore by way of said inlet opening comprising an elongate adapter sleeve adapted to externally embrace said rod and having an opening through the wall thereof intermediate its ends for registry with said inlet opening, and a one-piece anti-chafing line directing guide integrally mounted atop said sleeve, said guide being restricted at one end and flared at the other end and having a tapered open-ended line guiding passage in line-piloting alignment with said inlet opening, the smaller end of said passage being directed toward said inlet opening and the larger end of said passage being directed toward said reel and being flush with the corresponding end of said sleeve, the smaller end of said passage, as well as the same end of said guide, being spaced inwardly of the same end of said sleeve.

2. An attachment for a fishing rod comprising an elongated adapter sleeve adapted to be fitted on the rod in a manner to externally embrace the rod, said sleeve being provided intermediate its ends with a line opening through the surface thereof and being provided between said opening and one end with means for delivering the cast line from a reel through said opening into a bore provided therefor in said rod, said means comprising an anti-chafing line directing guide, the latter being substantially U-shaped in cross-section and having its legs resting securely on top of the sleeve on opposite sides of said opening and having one end flush with the corresponding one end of said sleeve, said passage being tapered and open at its respective ends and having its larger end adjacent said one end of said sleeve and its smaller end adjacent the intermediate portion of the sleeve and communicatable with the opening in said sleeve.

References Cited in the file of this patent

UNITED STATES PATENTS

| 1,595,275 | White | Aug. 10, 1926 |
| 2,282,618 | Stewart | May 12, 1942 |
| 2,324,429 | Rondelli | July 13, 1943 |

FOREIGN PATENTS

| 980,938 | France | May 21, 1951 |